(12) United States Patent
Truong et al.

(10) Patent No.: US 12,282,829 B2
(45) Date of Patent: Apr. 22, 2025

(54) TECHNIQUES FOR DATA TYPE DETECTION WITH LEARNED METADATA

(71) Applicant: Capital One Services, LLC, McLean, VA (US)

(72) Inventors: Anh Truong, Champaign, IL (US); Austin Grant Walters, Savoy, IL (US); Jeremy Edward Goodsitt, Champaign, IL (US)

(73) Assignee: Capital One Services, LLC, McLean, VA (US)

( * ) Notice: Subject to any disclaimer, the term of this patent is extended or adjusted under 35 U.S.C. 154(b) by 911 days.

(21) Appl. No.: 17/412,034

(22) Filed: Aug. 25, 2021

(65) Prior Publication Data

US 2023/0064886 A1    Mar. 2, 2023

(51) Int. Cl.
*G06F 16/00* (2019.01)
*G06N 20/00* (2019.01)

(52) U.S. Cl.
CPC .................................... *G06N 20/00* (2019.01)

(58) Field of Classification Search
CPC ............................... G06F 16/285; G06F 16/35
See application file for complete search history.

(56) References Cited

U.S. PATENT DOCUMENTS

| | | | | |
|---|---|---|---|---|
| 10,607,042 B1* | 3/2020 | Dasgupta | ............... | G06F 40/56 |
| 10,705,796 B1* | 7/2020 | Doyle | ............... | G06F 16/282 |
| 10,891,673 B1* | 1/2021 | Sawaf | ............... | G06F 16/3344 |
| 11,709,858 B2* | 7/2023 | Aggarwal | ............... | G06F 16/212 |
| | | | | 707/760 |
| 2004/0075930 A1* | 4/2004 | Sakai | ............... | G11B 20/10222 |
| 2018/0137390 A1 | 5/2018 | Brundage et al. | | |
| 2018/0189611 A1 | 7/2018 | Dal Mutto et al. | | |
| 2019/0179858 A1 | 6/2019 | Douze et al. | | |
| 2019/0236096 A1* | 8/2019 | Dal Mutto | ............... | G06N 3/045 |
| 2019/0250891 A1 | 8/2019 | Kumar et al. | | |
| 2020/0012933 A1 | 1/2020 | Truong et al. | | |
| 2020/0125575 A1* | 4/2020 | Ghoshal | ............... | G06F 3/0484 |
| 2020/0193206 A1 | 6/2020 | Turkelson et al. | | |
| 2020/0357137 A1 | 11/2020 | Zakharov et al. | | |

(Continued)

OTHER PUBLICATIONS

Author Unknown, "Word Embeddings", Tensorflow [online]. Retrieved from Internet URL: <https://www.tensorflow.org/tutorials/text/word_embeddings>. Retrieved on Apr. 8, 2020, 18 pages.

*Primary Examiner* — Noosha Arjomandi
(74) *Attorney, Agent, or Firm* — KDW Firm PLLC

(57) ABSTRACT

Various embodiments are generally directed to techniques for creating and utilizing multidimensional embedding spaces for data objects, such as to condition the data for input to a neural network, for instance. Some embodiments are particularly directed to detecting data types for structured data based on learned metadata. In many embodiments, an embedding space for a set of data objects may be customized with a set of dimensions that correspond to various characteristics of the set of data objects. For example, a set of data objects may correspond to a table with each data object corresponding to a data entry in the table. In such examples, correlations between different columns and/or within a column of data may be identified and utilized as metadata to improve classifications by the neural network.

20 Claims, 8 Drawing Sheets

(56) References Cited

U.S. PATENT DOCUMENTS

| | | |
|---|---|---|
| 2021/0019558 A1 | 1/2021 | Edge et al. |
| 2021/0182596 A1 | 6/2021 | Adams et al. |
| 2021/0201112 A1 | 7/2021 | Melancon et al. |
| 2021/0319004 A1* | 10/2021 | Walters .................. G06F 16/22 |
| 2023/0206069 A1 | 6/2023 | Zhang et al. |
| 2023/0351176 A1* | 11/2023 | Darmour ................. G06N 3/08 |

* cited by examiner

TECHNIQUES FOR DATA TYPE DETECTION WITH LEARNED METADATA

FIELD

The present disclosure relates generally to the field of pattern recognition. In particular, the present disclosure relates to devices, systems, and methods for data type detection with learned metadata.

BACKGROUND

Typically, a data file refers to a computer file which stores data to be used by a computer application or system. The data within the computer file can include further divisions or groupings. For example, a data file may include a set of samples or a set of data objects. In some embodiments, a data file may include an n×n array of data entries (e.g., a table). A data object can refer to a region of storage (e.g., a portion of a data file) that contains one or more values, such as a group of values and/or one or more hierarchies of grouped values (e.g., a data entry in the table). An embedding space, on the other hand, can be used to map a discrete variable to a vector of continuous numbers.

BRIEF SUMMARY

This summary is not intended to identify only key or essential features of the described subject matter, nor is it intended to be used in isolation to determine the scope of the described subject matter. The subject matter should be understood by reference to appropriate portions of the entire specification of this patent, any or all drawings, and each claim.

In one aspect, the present disclosure relates to an apparatus comprising a processor and memory comprising instructions that when executed by the processor cause the processor to perform one or more of: identify a set of data objects, the set of data objects comprising an array of values, wherein each data object in the set of data objects comprises a column value, a row value, and a data value; determine a first group of data objects in the set of data objects, the first group of data objects corresponding to a first column in the array of values; determine a second group of data objects in the set of data objects, the second group of data objects corresponding to a second column in the array of values that is adjacent to the first column in the array of values; concatenate data values from the first group of data objects with the data values from the second group of data objects in a row-wise manner to produce a concatenated group of data values; determine at least one of a set of a plurality of embedding space parameters based on the concatenated group of data values, wherein the set of embedding space parameters define an embedding space comprising a plurality of dimensions; and generate a set of object vectors, the set of object vectors comprising an object vector for each data object in the set of data objects, each object vector in the set of object vectors to include a set of dimension values and each dimension value in the set of dimension values to correspond to one of the plurality of dimensions in the embedding space, wherein a respective object vector for a respective data object is generated based on a respective column value of the respective data object, a respective row value of the respective data object, and the set of embedding space parameters.

In various embodiments, the instructions, when executed by the processor, further cause the processor to analyze each data value in the first group of data objects to determine one or more characteristics of the first column in the array of values; and determine at least one of the one or more embedding space parameters based on the one or more characteristics of the column in the array of values. In some embodiments, the one or more characteristics of the column comprises a range of lengths for data values in the column. In many embodiments, the instructions, when executed by the processor, further cause the processor to determine a third group of data objects in the set of data objects, the third group of data objects corresponding to a third column in the array of values that is adjacent to the first column on an opposite side as the second column in the array of values; concatenate data values from the first group of data objects with the data values from the third group of data objects in a row-wise manner to produce a second concatenated group of data values; and determine at least one of the set of embedding space parameters based on the second concatenated group of data values. In some embodiments, the instructions, when executed by the processor, further cause the processor to: provide the set of object vectors as input to a machine learning algorithm; and determine a classification of each data object in the set of data objects based on output of the machine learning algorithm in response to input of the set of object vectors. In various embodiments, the instructions, when executed by the processor, further cause the processor to: determine a third group of data objects in the set of data objects, the third group of data objects corresponding to a third column in the array of values that is adjacent to the first column or the second column in the array of values; concatenate data values from the first group of data objects with the data values from the second group of data objects and the third group of data objects in a row-wise manner to produce a second concatenated group of data values; and determine at least one of the set of embedding space parameters based on the second concatenated group of data values. In various such embodiments, the instructions, when executed by the processor, further cause the processor to: determine a fourth group of data objects in the set of data objects, the fourth group of data objects corresponding to a fourth column in the array of values that is adjacent to the first column, the second column, or the third column in the array of values; concatenate data values from the first group of data objects with the data values from the second group of data objects, the third group of data objects, and the fourth group of data objects in a row-wise manner to produce a third concatenated group of data values; and determine at least one of the set of embedding space parameters based on the third concatenated group of data values. In some embodiments, the plurality of dimensions that define the embedding space comprise two or more of a row dimension, a column dimension, a data value dimension, a column statistic dimension, and a concatenation dimension. In many embodiments, the plurality of dimensions that define the embedding space comprise a plurality of concatenation dimensions and at least one column statistic dimension.

In another aspect, the present disclosure relates to at least one non-transitory computer-readable medium comprising a set of instructions that, in response to execution by a processor circuit, cause the processor circuit to perform one or more of: identify a set of data objects, the set of data objects comprising an array of values, wherein each data object in the set of data objects comprises column value, a row value, and a data value; determine a first group of data objects in the set of data objects, the first group of data objects corresponding to a first column in the array of values; determine a second group of data objects in the set of data objects, the second group of data objects corresponding to a second column in the array of values that is adjacent to the first column in the array of values; concatenate data values from the first group of data objects with the data values from the second group of data objects in a row-wise manner to produce a concatenated group of data values; determine at least one of a set of a plurality of embedding space parameters based on the concatenated group of data values, wherein the set of embedding space parameters define an embedding space comprising a plurality of dimensions; and generate a set of object vectors, the set of object vectors comprising an object vector for each data object in the set of data objects, each object vector in the set of object vectors to include a set of dimension values and each dimension value in the set of dimension values to correspond to one of the plurality of dimensions in the embedding space, wherein a respective object vector for a respective data object is generated based on a respective column value of the respective data object, a respective row value of the respective data object, and the set of embedding space parameters.

In various embodiments, the set of instructions, in response to execution by the processor circuit, further cause the processor circuit to: analyze each data value in the first group of data objects to determine one or more characteristics of the first column in the array of values; and determine at least one of the one or more embedding space parameters based on the one or more characteristics of the column in the array of values. In some embodiments, the one or more characteristics of the column comprises a range of lengths for data values in the column. In many embodiments, the set of instructions, in response to execution by the processor circuit, further cause the processor circuit to: determine a third group of data objects in the set of data objects, the third group of data objects corresponding to a third column in the array of values that is adjacent to the first column on an opposite side as the second column in the array of values; concatenate data values from the first group of data objects with the data values from the third group of data objects in a row-wise manner to produce a second concatenated group of data values; and determine at least one of the set of embedding space parameters based on the second concatenated group of data values. In several embodiments, the set of instructions, in response to execution by the processor circuit, further cause the processor circuit to: provide the set of object vectors as input to a machine learning algorithm; and determine a classification of each data object in the set of data objects based on output of the machine learning algorithm in response to input of the set of object vectors. In various embodiments, the set of instructions, in response to execution by the processor circuit, further cause the processor circuit to: determine a third group of data objects in the set of data objects, the third group of data objects corresponding to a third column in the array of values that is adjacent to the first column or the second column in the array of values; concatenate data values from the first group of data objects with the data values from the second group of data objects and the third group of data objects in a row-wise manner to produce a second concatenated group of data values; and determine at least one of the set of embedding space parameters based on the second concatenated group of data values. In some embodiments, the plurality of dimensions that define the embedding space comprise two or more of a row dimension, a column dimension, a data value dimension, a column statistic dimension, and a concatenation dimension. In some such embodiments, the plurality of dimensions that define the embedding space comprise a plurality of concatenation dimensions and at least one column statistic dimension.

In yet another aspect, the present disclosure relates to a computer-implemented method, comprising one or more of: identifying a set of data objects, the set of data objects comprising an array of values, wherein each data object in the set of data objects comprises column value, a row value, and a data value; determining a first group of data objects in the set of data objects, the first group of data objects corresponding to a first column in the array of values; determining a second group of data objects in the set of data objects, the second group of data objects corresponding to a second column in the array of values that is adjacent to the first column in the array of values; concatenating data values from the first group of data objects with the data values from the second group of data objects in a row-wise manner to produce a concatenated group of data values; determining at least one of a set of a plurality of embedding space parameters based on the concatenated group of data values, wherein the set of embedding space parameters define an embedding space comprising a plurality of dimensions; and generating a set of object vectors, the set of object vectors comprising an object vector for each data object in the set of data objects, each object vector in the set of object vectors to include a set of dimension values and each dimension value in the set of dimension values to correspond to one of the plurality of dimensions in the embedding space, wherein a respective object vector for a respective data object is generated based on a respective column value of the respective data object, a respective row value of the respective data object, and the set of embedding space parameters.

In some embodiments, the computer-implemented method includes: analyzing each data value in the first group of data objects to determine one or more characteristics of the first column in the array of values; and determining at least one of the one or more embedding space parameters based on the one or more characteristics of the column in the array of values. In various embodiments, the computer implemented includes: providing the set of object vectors as input to a machine learning algorithm; and determining a classification of each data object in the set of data objects based on output of the machine learning algorithm in response to input of the set of object vectors.

DETAILED DESCRIPTION

Figure 1:
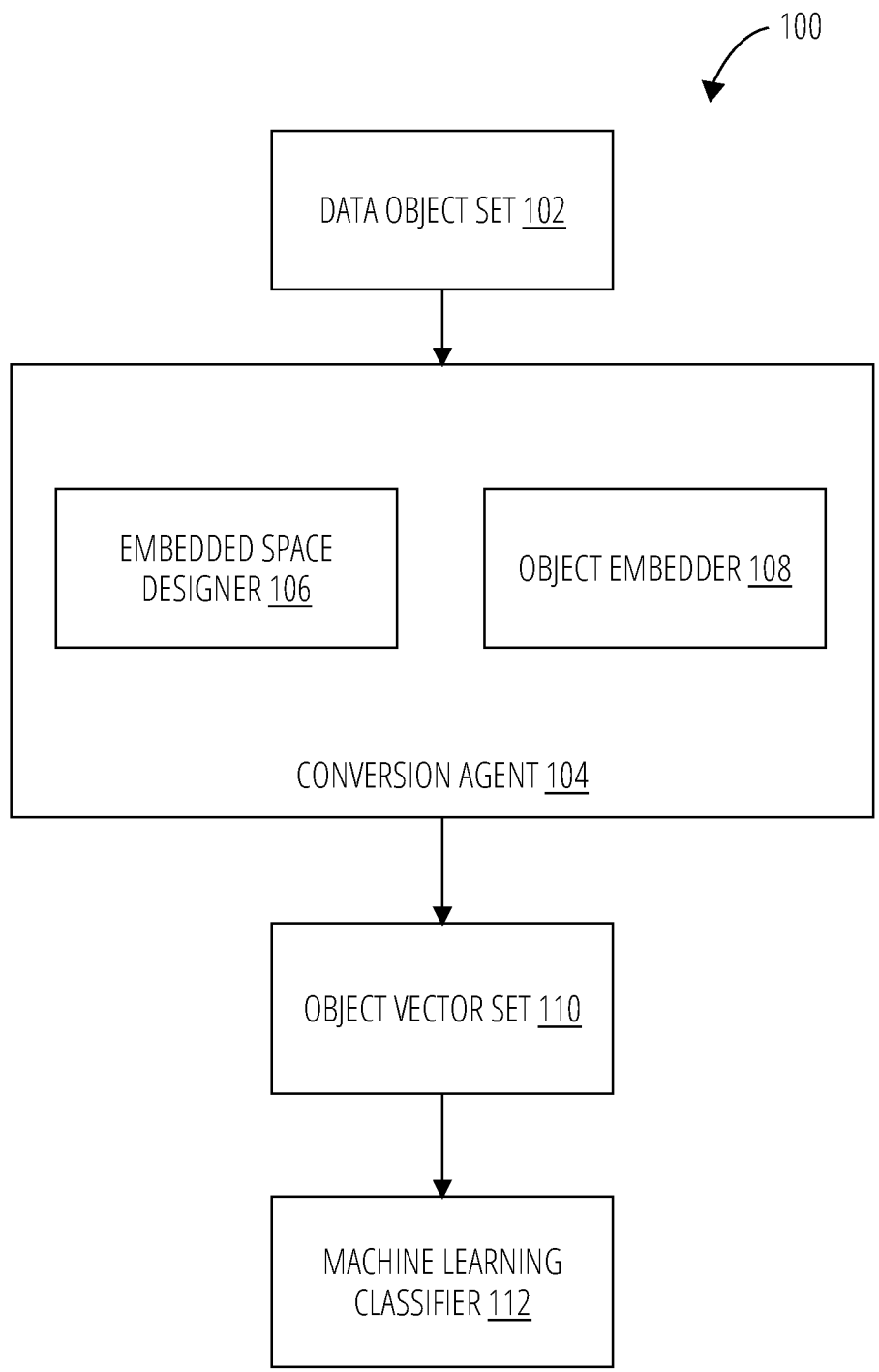
FIG. 1 illustrates an exemplary operating environment according to one or more embodiments described hereby.

Various embodiments are generally directed to techniques for creating and utilizing multidimensional embedding spaces for data objects, such as to condition the data for input to a neural network, for instance. Some embodiments are particularly directed to detecting data types for structured data based on learned metadata. In many embodiments, an embedding space for a set of data objects may be customized with a set of dimensions that correspond to various characteristics of the set of data objects. For example, a set of data objects may correspond to a table with each data object corresponding to a data entry in the table. In such examples, correlations between different columns and/or within a column of data may be identified and utilized as metadata to improve classifications by a neural network. These and other embodiments are described and claimed.

Some challenges facing data objects include classifying, correlating, and/or profiling them, such as with respect to determining data type. For instance, vast quantities of data objects may be generated as part of enterprise operations. However, oftentimes, the data objects are never correlated with other data objects or require extensive manual analysis to correlate them with other data objects. For example, a first name column may not be correlated with a last name column, and identifying first names independent of last names can be exceedingly difficult. Adding further complexity, data type determination can be important for creating accurate and useful predictive models. For example, knowing different data types can trigger different techniques for feature engineering and model selection. Additionally, data type detection can help sorting data sources to an appropriate ontology as well as assisting with detecting sensitive information. However, in some cases, due to the lack of additional data (e.g., column headers), the detecting probability is low for specific columns in structured datasets. These and other factors may result in lost efficiencies and underutilization of data objects, resulting in data objects with reduced applicability and poor adaptability, such as with respect to machine learning (ML) techniques. Such limitations can drastically reduce the usability of data objects, contributing to lost economies of scale, excessive data waste, and inefficient systems, devices, and techniques.

Various embodiments described hereby include a conversion agent to create and utilize multidimensional embedding spaces customized for data objects, such as to condition data for input to a neural network. Some embodiments are particularly directed to efficiently and effectively converting a set of data objects (e.g., an n×n array of data entries), into object vector sets mapped to a multidimensional embedding space customized for the set of data objects. In many embodiments, an embedding space for a set of data objects may include a customizable set of dimensions. In many such embodiments, each dimension may correspond to a unique characteristic, or indication thereof, of the set of data objects. For example, one dimension may correspond to a concatenation of an n-gram of columns. One or more embodiments described hereby may utilize the multidimensional embedding spaces to create an object vector set created from the set of data objects. In several embodiments, the conversion agent may map data objects into a multidimensional embedding space to facilitate classification of and/or correlation of and between data objects.

Many embodiments may incorporate correlations among columns. For example, a column may be concatenated with one or more surrounding columns to increase accuracy. In a further example, if a column including phone area codes is concatenated with a column including phone numbers, an ML model is more likely to identify the concatenation as a full phone number than when the ML model attempts to identify the phone area code column independent of the phone number. Several embodiments incorporate the statistics of an entire column for each column value to reduce uncertainty. For example, if a ML model is unsure about differentiating integers, social security numbers, and credit card numbers, it can utilize the range of value lengths for the entire column. Accordingly, if the range is varied, the data type is likely an integer, while for social security numbers and credit card numbers the range of values is typically narrow or unique. The correlations between other data entries and/or columns may be referred to as learned metadata. In these and other ways, techniques described hereby may utilize learned metadata to detect data types for structured data. Several embodiments include a machine learning classifier that is able to classify, produce, and/or correlate data in a data object with data in other data objects more accurately by using multidimensional embedding spaces. One or more of these components and/or techniques may be used as part of a process to automatically classify, correlate, and/or profile data objects to increase usability of data objects, resulting in more efficient and increased data utilization.

One or more techniques described hereby may facilitate accurate characterization of data by providing embedding spaces with customized dimensions, leading to useful and previously unknown relationships between data objects, such as columns or data entries in a structured data set, being identified. In these and other ways, components/techniques described here may identify methods to increase efficiency, decrease performance costs, decrease computational cost, and/or reduce resource requirements to correlate data objects in an accurate, reactive, efficient, dynamic, and scalable manner, resulting in several technical effects and advantages over conventional computer technology, including increased capabilities and improved adaptability. In various embodiments, one or more of the aspects, techniques, and/or components described hereby may be implemented in a practical application via one or more computing devices, and thereby provide additional and useful functionality to the one or more computing devices, resulting in more capable, better functioning, and improved computing devices. Further, one or more of the aspects, techniques, and/or components described hereby may be utilized to improve the technical fields of data management, document processing, embedding spaces, data analysis, pattern recognition, and/or machine learning.

In several embodiments, components described hereby may provide specific and particular manners of enabling identification of relationships between data objects to optimize utilization of the data objects, such as by improving data type detection. In several such embodiments, the specific and particular manners of enabling identification of relationships between data objects may include one or more of embedding data objects, or characteristics thereof, in multidimensional frames, training and/or using an encoder to generate latent space representations of data objects based on the multidimensional frames and using the latent space representations to classify the data objects.

In many embodiments, one or more of the components described hereby may be implemented as a set of rules that improve computer-related technology by allowing a function not previously performable by a computer that enables an improved technological result to be achieved. For example, the function allowed may include one or more of: identifying a set of data objects, the set of data objects comprising an array of values, wherein each data object in the set of data objects comprises column value, a row value, and a data value; determining a first group of data objects in the set of data objects, the first group of data objects corresponding to a first column in the array of values; determining a second group of data objects in the set of data objects, the second group of data objects corresponding to a second column in the array of values that is adjacent to the first column in the array of values; concatenating data values from the first group of data objects with the data values from the second group of data objects in a row-wise manner to produce a concatenated group of data values; determining at least one of a set of a plurality of embedding space parameters based on the concatenated group of data values, wherein the set of embedding space parameters define an embedding space comprising a plurality of dimensions; generating a set of object vectors, the set of object vectors comprising an object vector for each data object in the set of data objects, each object vector in the set of object vectors to include a set of dimension values and each dimension value in the set of dimension values to correspond to one of the plurality of dimensions in the embedding space, wherein a respective object vector for a respective data object is generated based on a respective column value of the respective data object, a respective row value of the respective data object, and the set of embedding space parameters; analyzing each data value in the first group of data objects to determine one or more characteristics of the first column in the array of values; determining at least one of the one or more embedding space parameters based on the one or more characteristics of the column in the array of values; providing the set of object vectors as input to a machine learning algorithm; and determining a classification of each data object in the set of data objects based on output of the machine learning algorithm in response to input of the set of object vectors.

With general reference to notations and nomenclature used hereby, one or more portions of the detailed description which follows may be presented in terms of program procedures executed on a computer or network of computers. These procedural descriptions and representations are used by those skilled in the art to effectively convey the substances of their work to others skilled in the art. A procedure is here, and generally, conceived to be a self-consistent sequence of operations leading to a desired result. These operations are those requiring physical manipulations of physical quantities. Usually, though not necessarily, these quantities take the form of electrical, magnetic, or optical signals capable of being stored, transferred, combined, compared, and otherwise manipulated. It proves convenient at times, principally for reasons of common usage, to refer to these signals as bits, values, elements, symbols, characters, terms, numbers, or the like. It should be noted, however, that all of these and similar terms are to be associated with the appropriate physical quantities and are merely convenient labels applied to those quantities.

Further, these manipulations are often referred to in terms, such as adding or comparing, which are commonly associated with mental operations performed by a human operator. However, no such capability of a human operator is necessary, or desirable in many cases, in any of the operations described hereby that form part of one or more embodiments. Rather, these operations are machine operations. Useful machines for performing operations of various embodiments include general purpose digital computers as selectively activated or configured by a computer program stored within that is written in accordance with the teachings hereby, and/or include apparatus specially constructed for the required purpose. Various embodiments also relate to apparatus or systems for performing these operations. These apparatuses may be specially constructed for the required purpose or may include a general-purpose computer. The required structure for a variety of these machines will be apparent from the description given.

Reference is now made to the drawings, wherein like reference numerals are used to refer to like elements throughout. In the following description, for purpose of explanation, numerous specific details are set forth in order to provide a thorough understanding thereof. It may be evident, however, that the novel embodiments can be practiced without these specific details. In other instances, well known structures and devices are shown in block diagram form to facilitate a description thereof. The intention is to cover all modification, equivalents, and alternatives within the scope of the claims.

FIG. 1 illustrates an exemplary operating environment 100 according to one or more embodiments described hereby. Operating environment 100 may include a set of one or more data objects 102, a conversion agent 104 with an embedding space designer 106 and an object embedder 108, an object vector set 110, and a machine learning classifier 112. In many embodiments described hereby, the embedding space designer 106 may create a customized embedding space for data object set 102. In many such embodiments, object embedder 108 may utilize the customized embedding space to convert the data object set 102 into object vector set 110. In some embodiments, the object vector set 110 may be provided to the machine learning classifier 112 as input. Embodiments are not limited in this context.

In many embodiments, embedding space designer 106 may analyze the data object set 102 to determine a set of embedding space parameters. In many such embodiments, the object embedder 108 may utilize the embedding space parameters to determine the object vector set 110 based on the data object set 102. In several embodiments, the object vector set 110 may be provided as input to machine learning classifier 112. For example, the object vector set 110 may be utilized to train a machine learning algorithm/model and/or the object vector set 110 may be classified by a machine learning algorithm/model. In several embodiments, the machine learning algorithm/model may include one or more of a neural network, a recurrent neural network (RNN), a convolutional neural network (CNN), long short-term memory (LSTM), and transformer based models (e.g., bidirectional encoder representations from transformers (BERT) and generative pre-trained transformer (GPT)). In many embodiments, the machine learning algorithm may be used to determine data types. For example, a column may be determined to include phone numbers, social security numbers, or credit card numbers. In some embodiments, an object vector set may be used to produce synthetic data. For instance, a machine learning algorithm may produce a synthetic set of data that has different content (e.g., different data values) than an original set of data, however, the synthetic set of data may share the same data correlations as the original set of data.

In many embodiments, the data object set 102 may include an n×n array of data (e.g., a table or spreadsheet). Further, each data object in data object set 102 may correspond to a data entry in the array of data. In many such embodiments, as will be discussed in more detail below, conversion agent 104 may convert the array of data into a multidimensional embedding space with one or more dimensions for concatenated columns and/or one or more dimensions for column statistics. In several embodiments, data objects may include one or more embedded data objects and/or layers thereof. In various embodiments, conversion agent 104 may map data objects onto an object vector set 110 comprising a vector of real numbers. Further, in some embodiments, a vector may represent a point in an n-dimensional space defined by the embedding space parameters. In many embodiments, the conversion agent 104 may structure data objects for embedding. The multidimensional embedding space may be customized based on the set of data objects.

In some embodiments, the data object set 102 may include key-value stores and/or JSON objects. For example, a set of data objects (e.g., JSON objects) may have the form: {key: value, key: {key: value}, key: value}. In many embodiments, the embedding space may include dimensions corresponding to one or more of a set of possible keys, a distribution of each value for a give key (e.g., normalized to between 0 to 1 or −1 to 1), depth of the data object (e.g., number of layers or embedded objects, such as internal sub-JSON objects), variance for key-values, data type for key-values, minimum for key-values, maximum for key-values, and the like. In some embodiments, the embedding space may include over a thousand dimensions.

In various embodiments, the key and/or the value may be part of the embedding. Accordingly, in many embodiments, key-values are embedded. In some embodiments, the input may be constructed such that the input vector represents all the keys (so each index represents one key) and the values can be placed in the index of corresponding keys. Alternatively, the input may be constructed from key-value combinations which are then embedded. For example, if the key is 'eventid', 'eventid' may be tokenized or have a label, etc. which allows it to be input with the value tokenization inside the embedding. In many embodiments, embeddings may be used for data generation and/or classification. Embeddings may be used to translate input into an n-dimensional space. Oftentimes this may be used to improve data separation. Modeling and/or analysis may then be done, such as regression, classification, generation, and the like.

In several embodiments, the machine learning classifier 112 may assign various classifications to data objects in data object set 102 using object vector set 110. For example, machine learning classifier 112 may assign classifications that correspond to each column in the data object set 102. In some embodiments, each data object in a column may be classified by classifying the column that includes the data objects. In other words, if a column is classified as first names, then each data object included in the column is thereby classified as a first name. In one or more embodiments, classifying columns and/or data objects may be utilized to extract features for the object vectors.

Figure 2A:
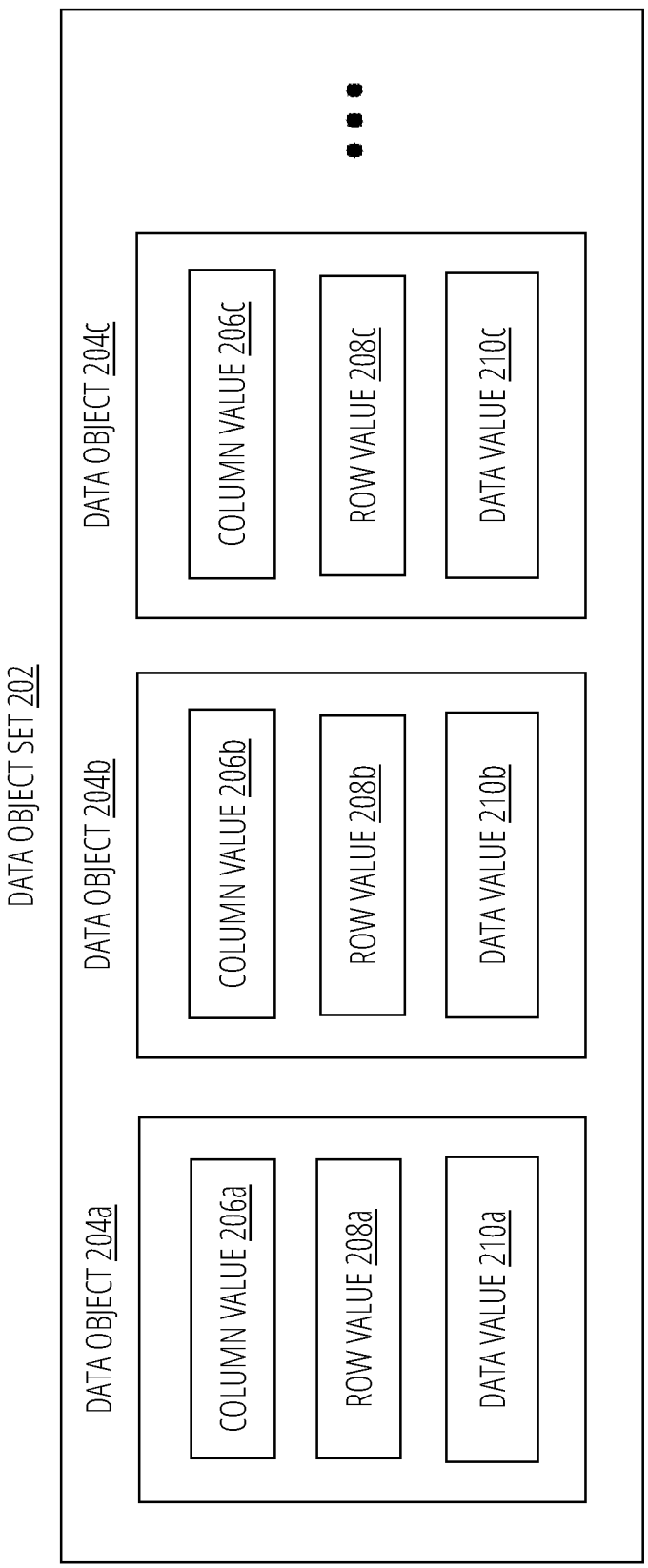
FIG. 2A illustrates an exemplary data object set according to one or more embodiments described hereby.

FIG. 2A illustrates a data object set 202 according to one or more embodiments described hereby. In the illustrated embodiment, data object set 202 includes data objects 204a, 204b, 204c. However, data object set 202 may include any number of data objects without departing from the scope of this disclosure. Data object 204a includes column value 206a, row value 208a, and data value 210a. Data object 204b includes column value 206b, row value 208b, and data value 210b. Data object 204c includes column value 206c, row value 208c, and data value 210c. In various embodiments, data object set 202 may include an n×n array of data entries and each of the data objects may refer to a data value at a unique column and row location. In many embodiments, the data object set 202 may comprise an array of values, such as a table of values or a database arranged in columns and rows). In some embodiments, FIG. 2A may include one or more components that are the same or similar to one or more other components described hereby. For example, data object set 202 may be the same or similar to data object set 102. Embodiments are not limited in this context.

Figure 2B:
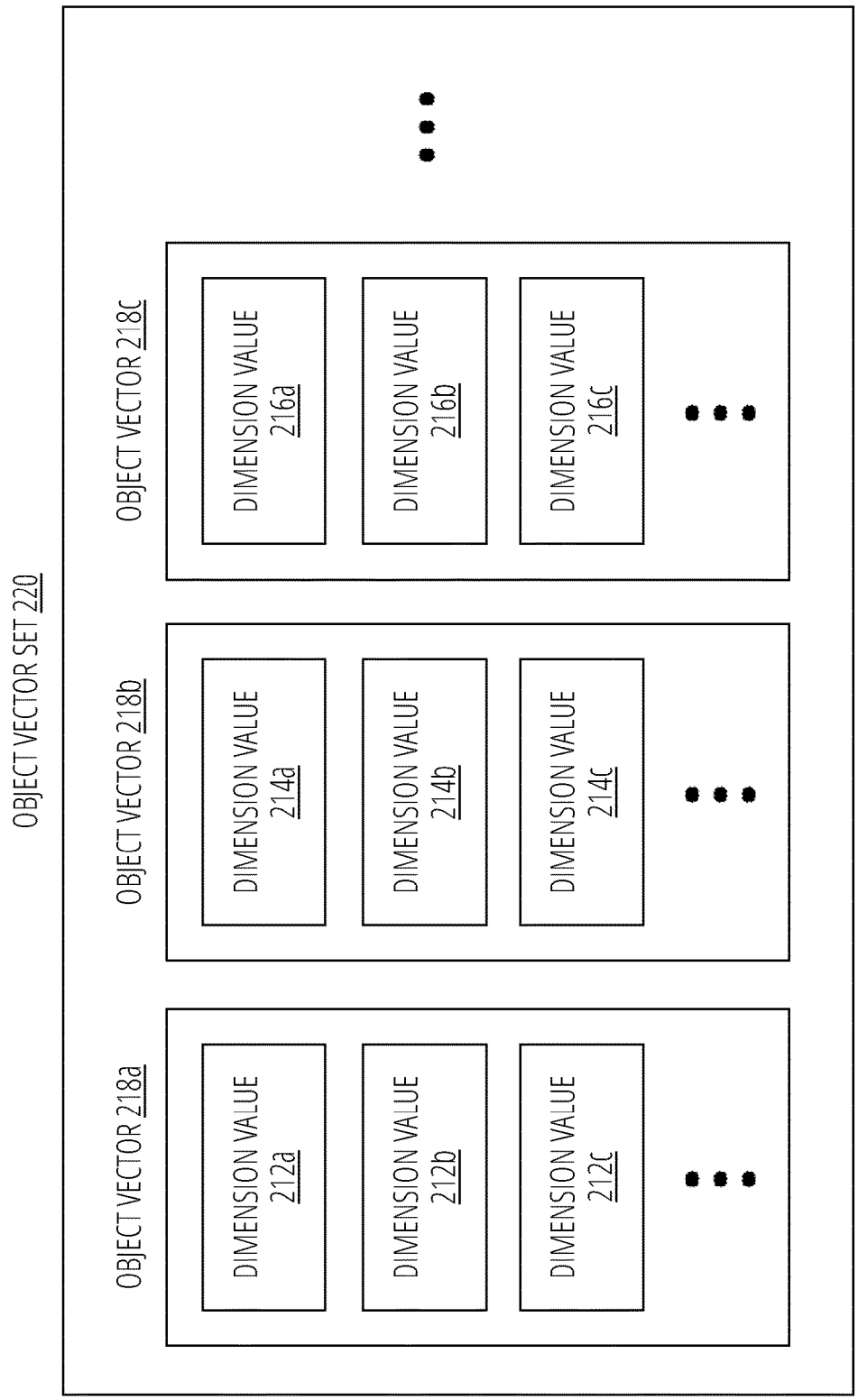
FIG. 2B illustrates an exemplary object vector set according to one or more embodiments described hereby.

FIG. 2B illustrates an object vector set 220 according to one or more embodiments described hereby. In the illustrated embodiment, object vector set 220 includes object vectors 218a, 218b, 218c. However, object vector set 220 may include any number of object vectors without departing from the scope of this disclosure. In many embodiments, the number of object vectors in object vector set 220 may correspond to the number of data objects in data object set 202. In other words, an object vector may be generated for each data object in the data object set. Each of the object vectors can include one or more dimension values corresponding to the number of dimensions in the embedding space. In the illustrated embodiment, object vector 218a includes dimension value 212a, dimension value 212b, and dimension value 212c, object vector 218b includes dimension value 214a, dimension value 214b, and dimension value 214c, and object vector 218c includes dimension value 216a, dimension value 216b, and dimension value 216c. In some embodiments, FIG. 2B may include one or more components that are the same or similar to one or more other components described hereby. For example, object vector set 220 may be the same or similar to object vector set 110. Embodiments are not limited in this context.

In many embodiments, a conversion agent (e.g., conversion agent 104) may design/create a multidimensional embedding space for the data object set 202. In many such embodiments, the conversion agent may translate the data object set 202 into the multidimensional embedding space to produce object vector set 210. In one or more embodiments described hereby, the conversion agent may determine an object vector for each data object in the data object set 202. For example, data object 204a may correspond to object vector 218a, data object 204b may correspond to object vector 218b, and data object 204c may correspond to object vector 218c. In several embodiments, each object vector may include a dimension value corresponding to every dimension in the embedding space. Accordingly, dimension values 212a, 214a, 216a may comprise values that map onto a first dimension in the embedding space, dimension values 212b, 214b, 216b may comprise values that map onto a second dimension in the embedding space, and dimension values 212c, 214c, 216c may comprise values that map onto a third dimension in the embedding space.

Figure 3:
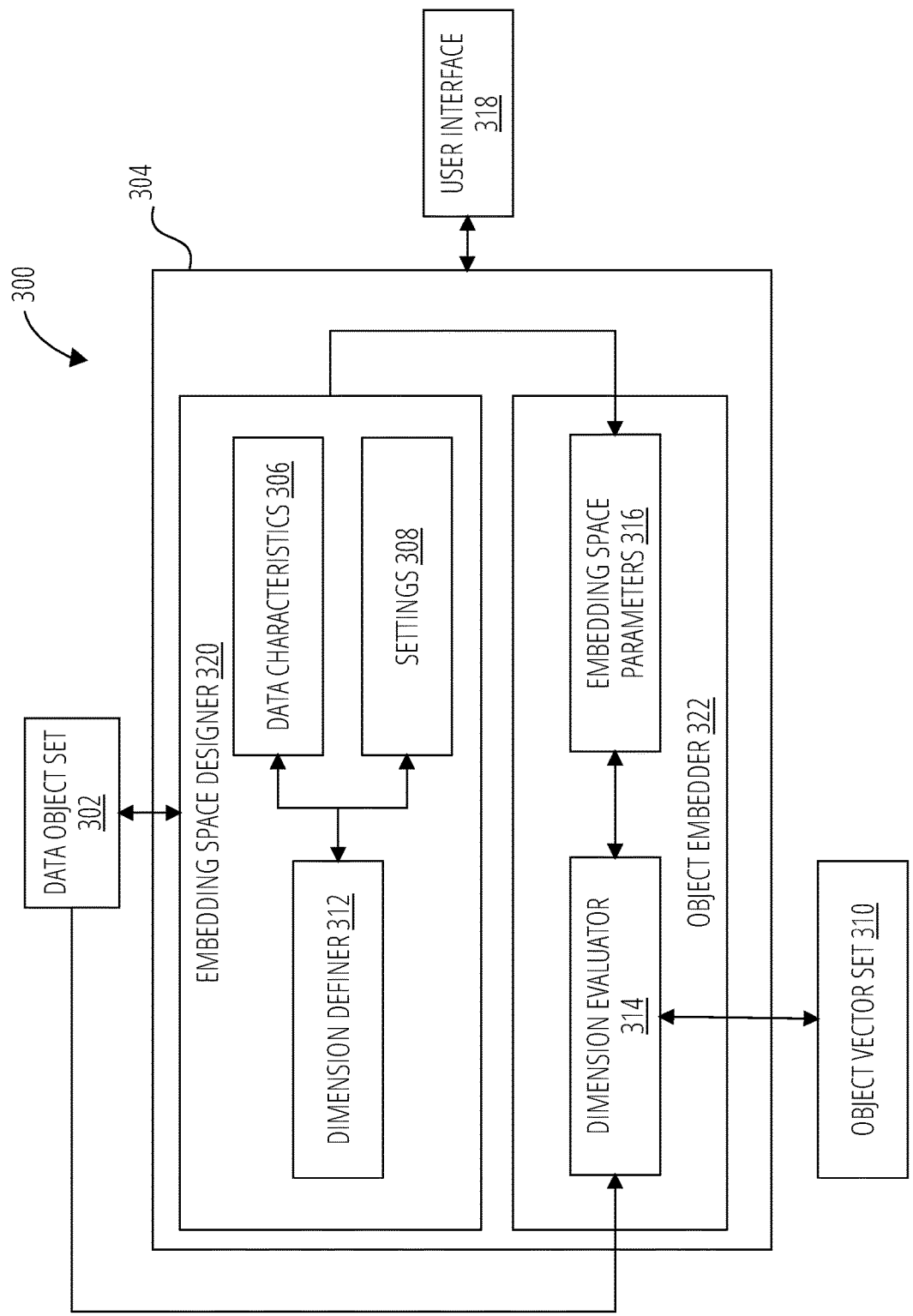
FIG. 3 illustrates various aspects of a conversion agent according to one or more embodiments described hereby.

FIG. 3 illustrates various aspects of a conversion agent 304 in operating environment 300 according to one or more embodiments described hereby. Environment 300 may include data object set 302, conversion agent 304, object vector set 310, and user interface 318. Conversion agent 304 may include embedding space designer 320 and object embedder 322. Embedding space designer 320 may include dimension definer 312, data characteristics 306, and settings 308. Object embedder 322 may include dimension evaluator 314 and embedding space parameters 316. In one or more embodiments described hereby, conversion agent 304 may utilize data object set 302 and/or input received via user interface 318 to determine embedding space parameters 316. In many embodiments, conversion agent 304 may utilize data object set 302 and/or input received via user interface 318 to generate object vector set 310 based on embedding space parameters 316. In some embodiments, operating environment 300 may include one or more components that are the same or similar to one or more other components described hereby. For example, conversion agent 304 may be the same or similar to conversion agent 104. Embodiments are not limited in this context.

In several embodiments, embedding space designer 320 may analyze data object set 302 to determine one or more data characteristics 306 of the data object set 302, or a subset of the data object set 302 (e.g., a column or set of columns). In some embodiments, data characteristics 306 may include one or more of results of a statistical analysis, data types, depth of data objects, classifications, labels, possible values, ranges (e.g., range of value lengths in a column), and the like. For example, results of statistical analysis may include one or more of a distribution, variance, maximum value, minimum value, mean, median, mode, error, root mean square (RMS), moment, quantiles, and the like. In many embodiments, dimension definer 312 may determine embedding space parameters 316 based on data characteristics 306 and settings 308. In many such embodiments, one or more of the settings 308 may be determined based on input received via user interface 318.

In various embodiments, settings 308 may include one or more properties of and/or preference for the embedding space defined by embedding space parameters 316. For instance, settings 308 may indicate which columns to concatenate or include a maximum or minimum number of dimensions in the embedding space. In another instance, settings 308 may indicate how to normalize values. In yet another instance, settings 308 may dictate one or more dimensions in the embedding space, such as concatenating columns in a sliding window of n-length. For example, a sliding window of length three would result in, for column three in a set of six columns, would result in concatenation of columns one, two, and three, concatenation of columns two, three, four, and concatenation of columns three, four, and five. In some embodiments, on or more of the settings 308 and/or embedding space parameters 316 may be determined based on hyper-parameter optimization. For example, the length of the sliding window may be determined based on hyper-parameter optimization. In such examples, the length of the sliding window may be identified as the length with the highest accuracy for the model. In some embodiments, nonadjacent columns may be concatenated. For example, a first column comprising first names may be concatenated with a third column comprising last names, while a second column comprising middle names may not be concatenated with the first or third columns. In various embodiments, one or more data characteristics may be pre-determined, (e.g., cardinality and/or correlated columns). In various such embodiments, the pre-determined data characteristics may be included as data object set metadata. In several embodiments, the pre-determined data characteristics may be utilized to reduce processing resource requirements. For example, pre-determined data characteristics may be used to filter out columns and/or data objects from unnecessary processing.

In various embodiments, dimension definer 312 may produce embedding space parameters 316 based on data characteristics 306 and/or settings 308. In many embodiments, the embedding space parameters 316 may define the multidimensional embedding space for translation of data object set 302. In many such embodiments, each object vector in object vector set 310 may include a point in the multidimensional embedding space. In some embodiments, embedding space parameters 316 may include metadata, such as regarding the embedding space, data objects, or relationships between data objects. In several embodiments, dimension evaluator 314 may determine an object vector in object vector set 310 for each data object in data object set 302. In several such embodiments, each object vector may include a value for each dimension in the embedding space.

Many embodiments may incorporate dimensions for correlations among and/or within columns. For example, a column may be concatenated with one or more surrounding columns to increase accuracy. In a further example, if a column including phone area codes is concatenated with a column including phone numbers, an ML model may be more likely to identify the concatenation as a full phone number than when the ML model attempts to identify the phone area code column independent of the phone number. In another example, if a column including first names is concatenated with a column including last names, an ML model may be more likely to identify the concatenation as a full name than when the ML model attempts to identify the first name column independent of the last name column. In yet another example, if a column including street addresses is concatenated with a column including zip codes and a column including states, an ML model may be more likely to identify the concatenation as the full address than when the ML model attempts to identify the street address column, the zip code column, and the state column independently.

Several embodiments incorporate the statistics of an entire column for each column value to reduce uncertainty. For example, if a ML model is unsure about differentiating integers, social security numbers, and credit card numbers, it can utilize the range of value lengths for the entire column. Accordingly, if the range is varied, the data type is likely an integer, while for social security numbers and credit card numbers the range of values is typically narrow or unique. The correlations between other data entries and/or columns may be referred to as learned metadata.

In some embodiments, user interface 318 may be used to initialize or initiate one or more operations of conversion agent 304. For example, embedding space parameters 316 may be generated in response to an operation initiated via user interface 318. In another example, translation of data object set 302 to object vector set 310 based on embedding space parameters 316 may be initiated via user interface 318. In various embodiments, user interface 318 may be utilized to review and/or confirm parameters. For instance, proposed embedding space parameters may be presented via the user interface 318 for review and/or confirmation.

Figure 4:
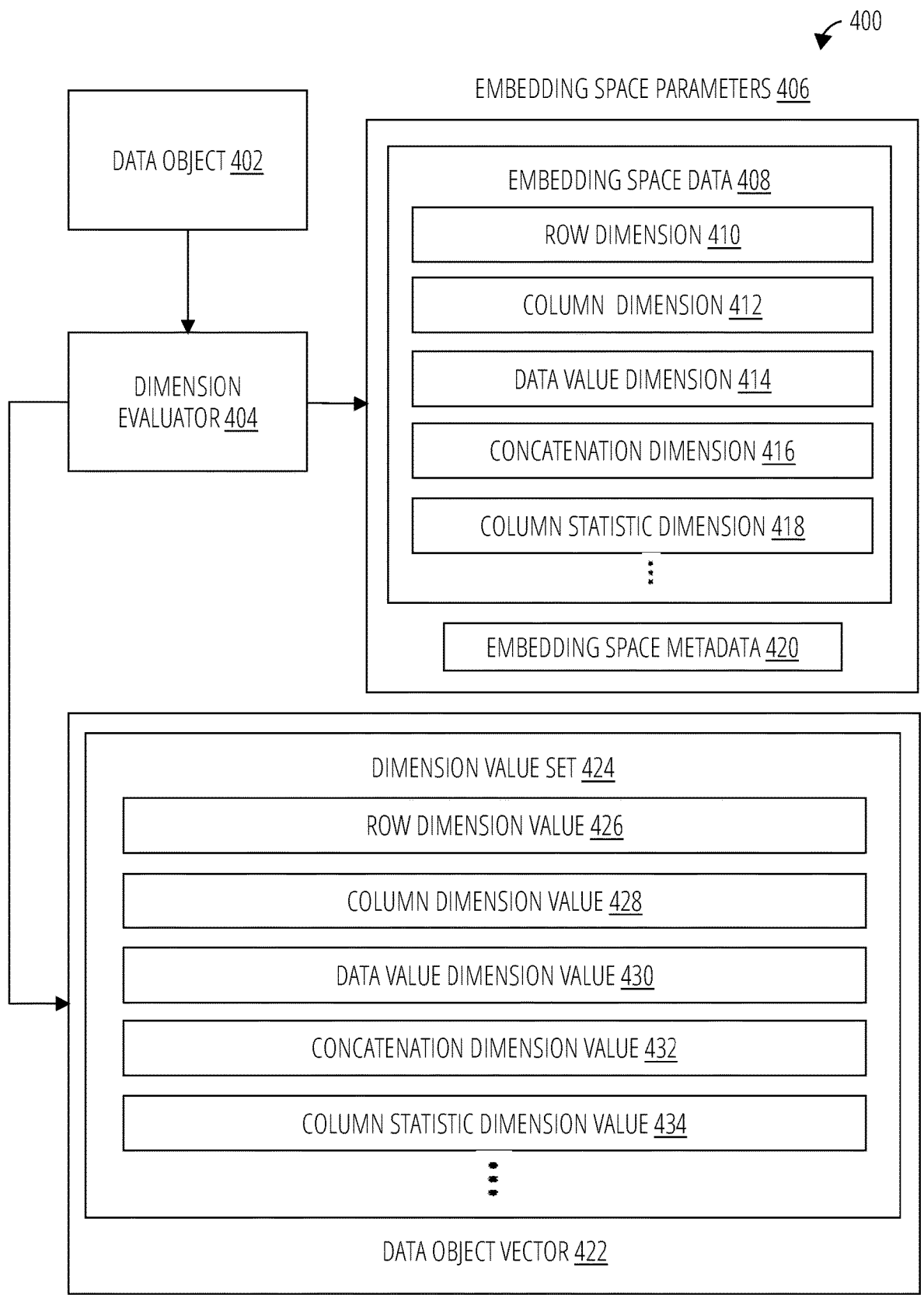
FIG. 4 illustrates various aspects of a dimension evaluator according to one or more embodiments described hereby.

FIG. 4 illustrates various aspects of a dimension evaluator 404 in operating environment 400 according to one or more embodiments described hereby. Operating environment 400 may include data object 402, dimension evaluator 404, embedding space parameters 406, and data object vector 422. Embedding space parameters 406 include embedding space data 408 and embedding space metadata 420. Data object vector 422 may include dimension value set 424. In one or more embodiments described hereby, dimension evaluator 404 may convert data object 402 into data object vector 422 based on embedding space parameters 406. In some embodiments, operating environment 400 may include one or more components that are the same or similar to one or more other components described hereby. For example, dimension evaluator 448 may be the same or similar to dimension evaluator 348. In another example, data object 402 may be the same or similar to object 202-1 and/or data object vector 422 may be the same or similar to object vector 218-1. Embodiments are not limited in this context.

In the illustrated embodiment, embedding space parameters 406 may include embedding space data 408 and embedding space metadata 420. Further, data object vector 422 may include dimension value set 424. In various embodiments, embedding space data 408 may include indications of each dimension in the embedding space. In many embodiments, embedding space metadata 420 may include one or more indications associated with embedding space data 408. For example, embedding space metadata 420 may indicate a total number of dimensions or how to determine a value for a dimension (e.g., window of n length for concatenation).

In the illustrated embodiment, embedding space data 408 may include row dimension 410, column dimension 412, data value dimension 414, concatenation dimension 416, and column statistic dimension 418. However, as previously mentioned, the embedding space may have any number of dimensions, thus embedding space data 408 may have a corresponding number of dimensions. For example, embedding space data 408 may include a plurality of concatenation dimensions (e.g., one for each concatenation) and/or a plurality of column statistic dimensions (e.g., one for each statistic). Similarly, dimension value set 424 may include row dimension value 426, column dimension value 428, data value dimension value 430, concatenation dimension value 432, and column statistic dimension value 434, but dimension value set 424 may include any number of values corresponding to the number of dimensions in the embedding space. In some embodiments, one or more of the following dimensions may be utilized: a key dimension, an object value dimension, a key distribution dimension, an object value distribution dimension, an object depth dimension, a variance dimension, a minimum object value dimension, and a maximum object value dimension. Thus, embedding space parameters 406 may define an n-dimension embedding space and a corresponding data object vector may include a value for each of the n-dimensions. Accordingly, dimension evaluator 404 may produce data object vector 422 from data object 402 based on embedding space parameters 406, and the resulting dimension value set 424 for the data object vector 422 may include five or more values with a row dimension value 426, a column dimension value 428, a data value dimension value 430, a concatenation dimension value 432, and a column statistic dimension value 434.

Figure 5:
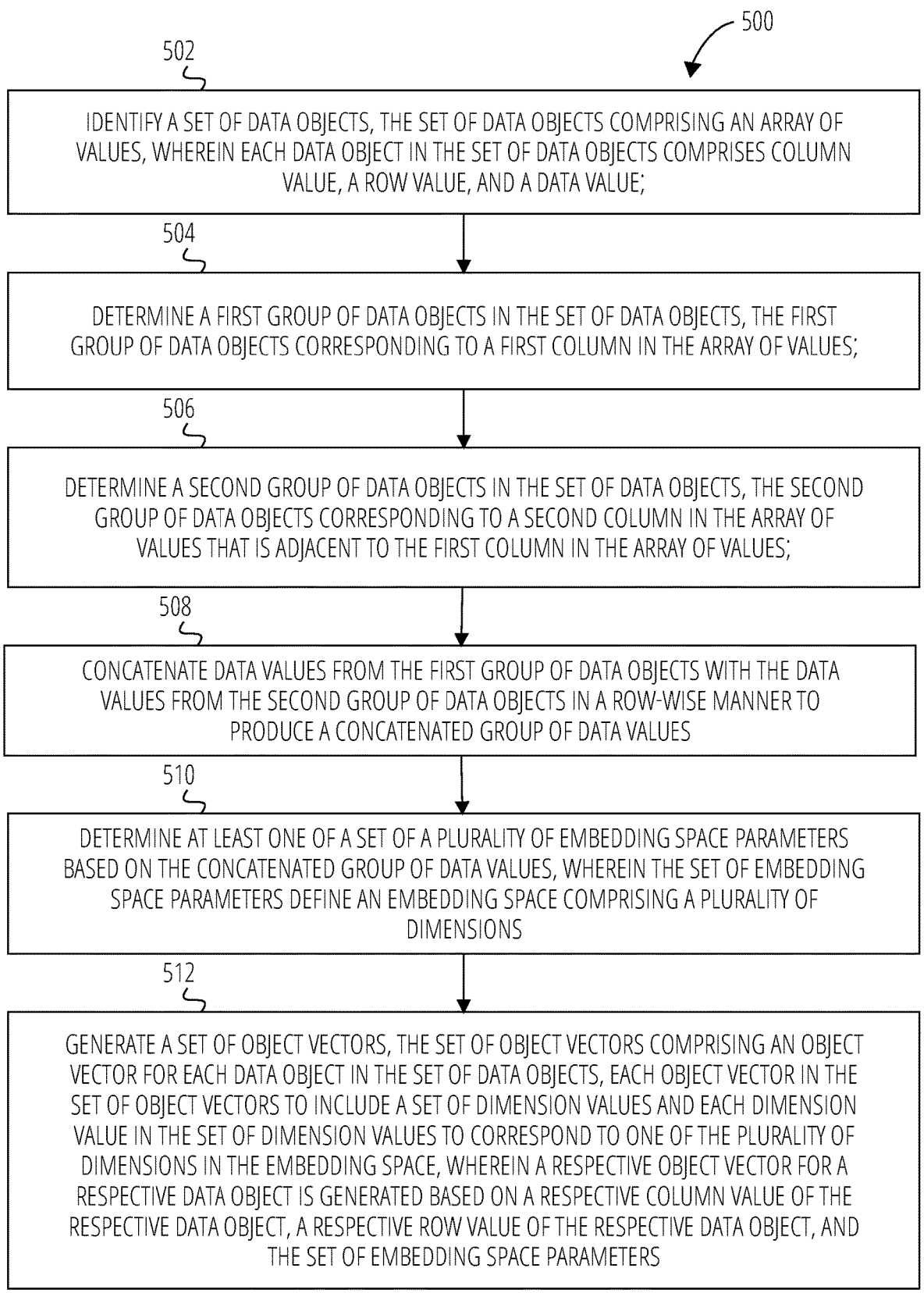
FIG. 5 illustrates an exemplary logic flow according to one or more embodiments described hereby.

FIG. 5 illustrates one embodiment of a logic flow 500, which may be representative of operations that may be executed in various embodiments in conjunction with techniques disclosed hereby. The logic flow 500 may be representative of some or all of the operations that may be executed by one or more components/devices/environments described hereby, such as conversion agent 104, embedding space designer 320, object embedder 322, or dimension evaluator 404. The embodiments are not limited in this context.

In the illustrated embodiment, logic flow 500 may begin at block 502. At block 502 "identify a set of data objects, the set of data objects comprising an array of values, wherein each data object in the set of data objects comprises column value, a row value, and a data value" a set of data objects comprising an array of values is identified. Further, each data object in the set of data objects may include a column value, a row value, and a data value. For example, conversion agent 104 may identify data object set 202, and each data object in the data object set 202 may include a column value, a row value, and a data value.

Continuing to block 504 "determine a first group of data objects in the set of data objects, the first group of data objects corresponding to a first column in the array of values" a first group of data objects corresponding to a first column in the array of values may be identified. For example, data objects 204a, 204b, 204c in data object set 202 may correspond to a first column in the array of values.

In such examples, data objects 204a, 204b, 204c may correspond to the first column because they have a common column value, such as one.

At block 506 "determine a second group of data objects in the set of data objects, the second group of data objects corresponding to a second column in the array of values that is adjacent to the first column in the array of values" a second group of data objects corresponding to a second column in the array of values that is adjacent to the first column may be identified. For example, although not illustrated, data object set 202 may include data objects 204d, 204e, 204f (with column values 206d, 206e, 206f, row values 208d, 208e, 208f, and data values 210d, 210e, 210f) that correspond to a second column in the array of values. In such examples, data objects 204d, 204e, 204f may correspond to the second column because they have a common column value, such as two.

Proceeding to block 508 "concatenate data values from the first group of data objects with the data values from the second group of data objects in a row-wise manner to produce a concatenated group of data values" data values from the first group of data objects may be concatenated with data values from the second group of data objects in a row-wise manner to produce a concatenated group of data values. For example, data value 210a of data object 204a may be concatenated with data value 210d of data object 204d, data value 210b of data object 204b may be concatenated with data value 210e of data object 204e, and data value 210c of data object 204c may be concatenated with data value 210f of data object 204f. In such examples, the data values may be concatenated together from groups one and two because they share a common row value.

Continuing to block 510 "determine at least one of a set of a plurality of embedding space parameters based on the concatenated group of data values, wherein the set of embedding space parameters define an embedding space comprising a plurality of dimensions" at least one of a set of a plurality of embedding space parameters may be determined based on the concatenated group of data values. Further, the set of embedding space parameters may define an embedding space comprising a plurality of dimensions. For example, dimension evaluator 404 may determine concatenation dimension 416 in embedding space data 408 of embedding space parameters 406 based on the concatenated group of data values. Further, the embedding space parameters 406 may define an embedding space comprising a plurality of dimensions, such as two or more of row dimension 410, column dimension 412, data value dimension 414, concatenation dimension 416, and column statistic dimension 418.

At block 512 "generate a set of object vectors, the set of object vectors comprising an object vector for each data object in the set of data objects, each object vector in the set of object vectors to include a set of dimension values and each dimension value in the set of dimension values to correspond to one of the plurality of dimensions in the embedding space, wherein a respective object vector for a respective data object is generated based on a respective column value of the respective data object, a respective row value of the respective data object, and the set of embedding space parameters" a set of object vectors comprising an object vector for each data object in the set of data objects may be generated. Further, each object vector in the set of object vectors may include a set of dimension values and each dimension value in the set of dimension values may correspond to one of the plurality of dimensions in the embedding space. Still further, a respective object vector for a respective data object is generated based on a respective column value of the respective data object, a respective row value of the respective data object, and the set of embedding space parameters. For example, dimension evaluator 404 may generate data object vector 422 based on data object 402 and embedding space parameters 406. Additionally, data object vector 422 may include dimension value set 424 with row dimension value 426, column dimension value 428, data value dimension value 430, concatenation dimension value 432, and column statistic dimension value 434 corresponding to data object 402.

Figure 6:
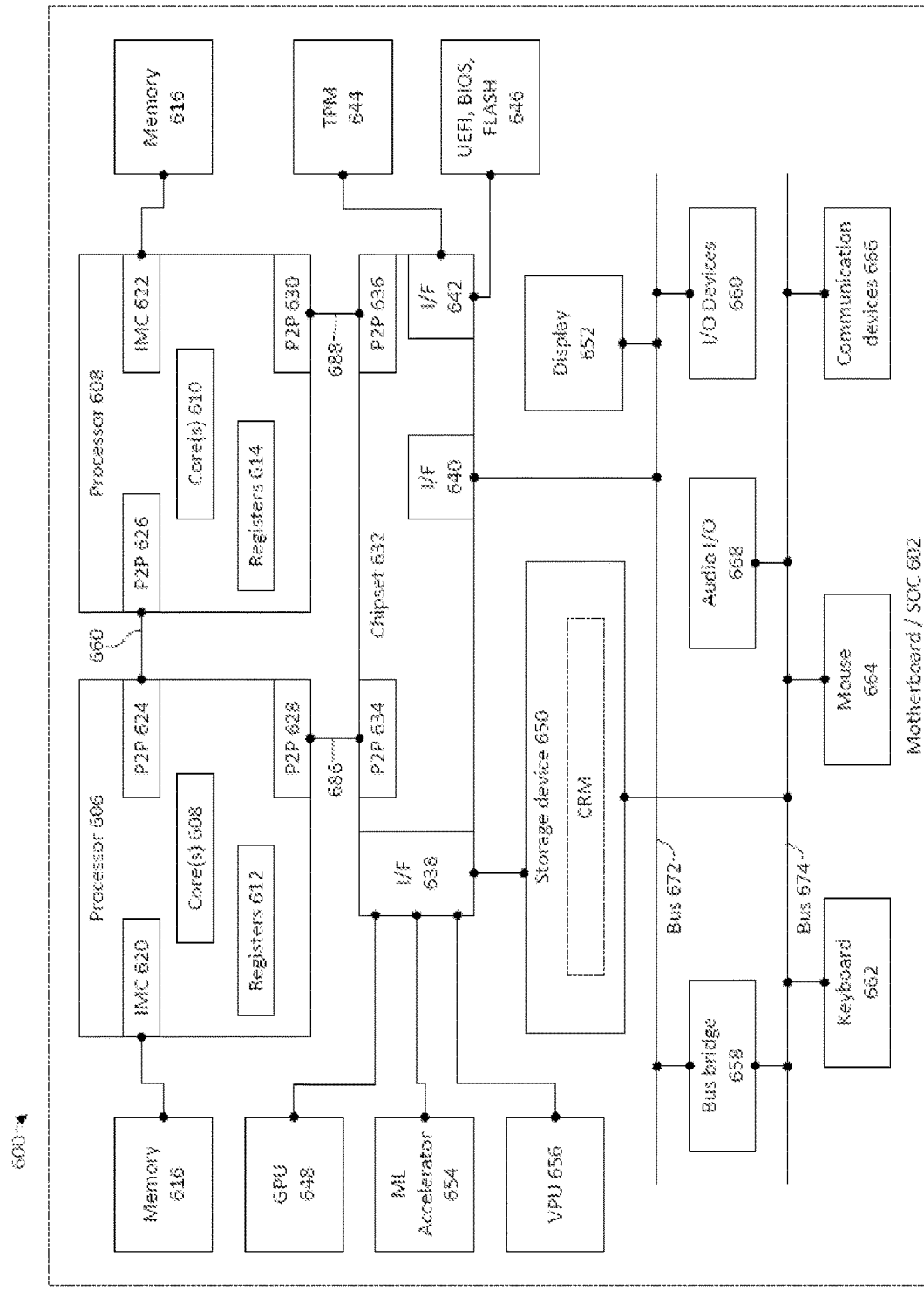
FIG. 6 illustrates exemplary aspects of a computing system according to one or more embodiments described hereby.

FIG. 6 illustrates an embodiment of a system 600 that may be suitable for implementing various embodiments described hereby. System 600 is a computing system with multiple processor cores such as a distributed computing system, supercomputer, high-performance computing system, computing cluster, mainframe computer, mini-computer, client-server system, personal computer (PC), workstation, server, portable computer, laptop computer, tablet computer, handheld device such as a personal digital assistant (PDA), or other device for processing, displaying, or transmitting information. Similar embodiments may comprise, e.g., entertainment devices such as a portable music player or a portable video player, a smart phone or other cellular phone, a telephone, a digital video camera, a digital still camera, an external storage device, or the like. Further embodiments implement larger scale server configurations. In some embodiments, the system 600 may have a single processor with one core or more than one processor. Note that the term "processor" refers to a processor with a single core or a processor package with multiple processor cores. In at least one embodiment, the computing system 600, or one or more components thereof, is representative of one or more components described hereby, such as conversion agent 104, embedding space designer 320, object embedder 322, user interface 318, and dimension evaluator 404. More generally, the computing system 600 is configured to implement all logic, systems, logic flows, methods, apparatuses, and functionality described hereby with reference to FIGS. 1-7. The embodiments are not limited in this context.

As used in this application, the terms "system" and "component" and "module" are intended to refer to a computer-related entity, either hardware, a combination of hardware and software, software, or software in execution, examples of which are provided by the exemplary system 600. For example, a component can be, but is not limited to being, a process running on a processor, a processor, a hard disk drive, multiple storage drives (of optical, solid-state, and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers. Further, components may be communicatively coupled to each other by various types of communications media to coordinate operations. The coordination may involve the uni-directional or bi-directional exchange of information. For instance, the components may communicate information in the form of signals communicated over the communications media. The information can be implemented as signals allocated to various signal lines. In such allocations, each message is a signal. Further embodiments, however, may alternatively employ data messages. Such data messages may be sent across various connections. Exemplary connections include parallel interfaces, serial interfaces, and bus interfaces.

As shown in this figure, system 600 comprises a motherboard or system-on-chip (SoC) 602 for mounting platform components. Motherboard or system-on-chip (SoC) 602 is a point-to-point (P2P) interconnect platform that includes a first processor 604 and a second processor 606 coupled via a point-to-point interconnect 670 such as an Ultra Path Interconnect (UPI). In many embodiments, the system 600 may be of another bus architecture, such as a multi-drop bus. Furthermore, each of processor 604 and processor 606 may be processor packages with multiple processor cores including core(s) 608 and core(s) 610, respectively. While the system 600 is an example of a two-socket (2S) platform, various embodiments may include more than two sockets or one socket. For example, some embodiments may include a four-socket (4S) platform or an eight-socket (8S) platform. Each socket is a mount for a processor and may have a socket identifier. Note that the term platform refers to the motherboard with certain components mounted such as the processor 604 and chipset 632. Some platforms may include additional components and some platforms may only include sockets to mount the processors and/or the chipset. Furthermore, some platforms may not have sockets (e.g., SoC, or the like).

The processor 604 and processor 606 can be any of various commercially available processors, including without limitation an Intel® processors; AMD® processors; ARM® application, embedded, and secure processors; IBM® processors; and similar processors. Dual microprocessors, multi-core processors, and other multi-processor architectures may also be employed as the processor 604 and/or processor 606. Additionally, the processor 604 need not be identical to processor 606.

Processor 604 includes an integrated memory controller (IMC) 620 and point-to-point (P2P) interface 624 and P2P interface 628. Similarly, the processor 606 includes an IMC 622 as well as P2P interface 626 and P2P interface 630. IMC 620 and IMC 622 couple the processors processor 604 and processor 606, respectively, to respective memories (e.g., memory 616 and memory 618). Memory 616 and memory 618 may be portions of the main memory (e.g., a dynamic random-access memory (DRAM)) for the platform such as double data rate type 3 (DDR3) or type 4 (DDR4) synchronous DRAM (SDRAM). In the present embodiment, the memories memory 616 and memory 618 locally attach to the respective processors (i.e., processor 604 and processor 606). In several embodiments, the main memory may couple with the processors via a bus and shared memory hub.

System 600 includes chipset 632 coupled to processor 604 and processor 606. Furthermore, chipset 632 can be coupled to storage device 650, for example, via an interface (I/F) 638. The I/F 638 may be, for example, a Peripheral Component Interconnect-enhanced (PCI-e). Storage device 650 can store instructions executable by circuitry of system 600 (e.g., processor 604, processor 606, GPU 648, ML accelerator 654, vision processing unit 656, or the like). For example, storage device 650 can store instructions for conversion agent 104, embedding space designer 320, object embedder 322, user interface 318, and dimension evaluator 404, or the like. In another example, storage device 650 can store data, such as data object set 302 or object vector set 310.

Processor 604 couples to a chipset 632 via P2P interface 628 and P2P 634 while processor 606 couples to a chipset 632 via P2P interface 630 and P2P 636. Direct media interface (DMI) 676 and DMI 678 may couple the P2P interface 628 and the P2P 634 and the P2P interface 630 and P2P 636, respectively. DMI 676 and DMI 678 may be a high-speed interconnect that facilitates, e.g., eight Giga Transfers per second (GT/s) such as DMI 3.0. In many embodiments, the processor 604 and processor 606 may interconnect via a bus.

The chipset 632 may comprise a controller hub such as a platform controller hub (PCH). The chipset 632 may include a system clock to perform clocking functions and include interfaces for an I/O bus such as a universal serial bus (USB), peripheral component interconnects (PCIs), serial peripheral interconnects (SPIs), integrated interconnects (I2Cs), and the like, to facilitate connection of peripheral devices on the platform. In many embodiments, the chipset 632 may comprise more than one controller hub such as a chipset with a memory controller hub, a graphics controller hub, and an input/output (I/O) controller hub.

In the depicted example, chipset 632 couples with a trusted platform module (TPM) 644 and UEFI, BIOS, FLASH circuitry 646 via I/F 642. The TPM 644 is a dedicated microcontroller designed to secure hardware by integrating cryptographic keys into devices. The UEFI, BIOS, FLASH circuitry 646 may provide pre-boot code.

Furthermore, chipset 632 includes the I/F 638 to couple chipset 632 with a high-performance graphics engine, such as, graphics processing circuitry or a graphics processing unit (GPU) 648. In some embodiments, the system 600 may include a flexible display interface (FDI) (not shown) between the processor 604 and/or the processor 606 and the chipset 632. The FDI interconnects a graphics processor core in one or more of processor 604 and/or processor 606 with the chipset 632.

Additionally, ML accelerator 654 and/or vision processing unit 656 can be coupled to chipset 632 via I/F 638. ML accelerator 654 can be circuitry arranged to execute ML related operations (e.g., training, inference, etc.) for ML models. Likewise, vision processing unit 656 can be circuitry arranged to execute vision processing specific or related operations. In particular, ML accelerator 654 and/or vision processing unit 656 can be arranged to execute mathematical operations and/or operands useful for machine learning, neural network processing, artificial intelligence, vision processing, etc.

Various I/O devices 660 and display 652 couple to the bus 672, along with a bus bridge 658 which couples the bus 672 to a second bus 674 and an I/F 640 that connects the bus 672 with the chipset 632. In one embodiment, the second bus 674 may be a low pin count (LPC) bus. Various devices may couple to the second bus 674 including, for example, a keyboard 662, a mouse 664 and communication devices 666.

Furthermore, an audio I/O 668 may couple to second bus 674. Many of the I/O devices 660 and communication devices 666 may reside on the motherboard or system-on-chip (SoC) 602 while the keyboard 662 and the mouse 664 may be add-on peripherals. In many embodiments, some or all the I/O devices 660 and communication devices 666 are add-on peripherals and do not reside on the motherboard or system-on-chip (SoC) 602.

Figure 7:
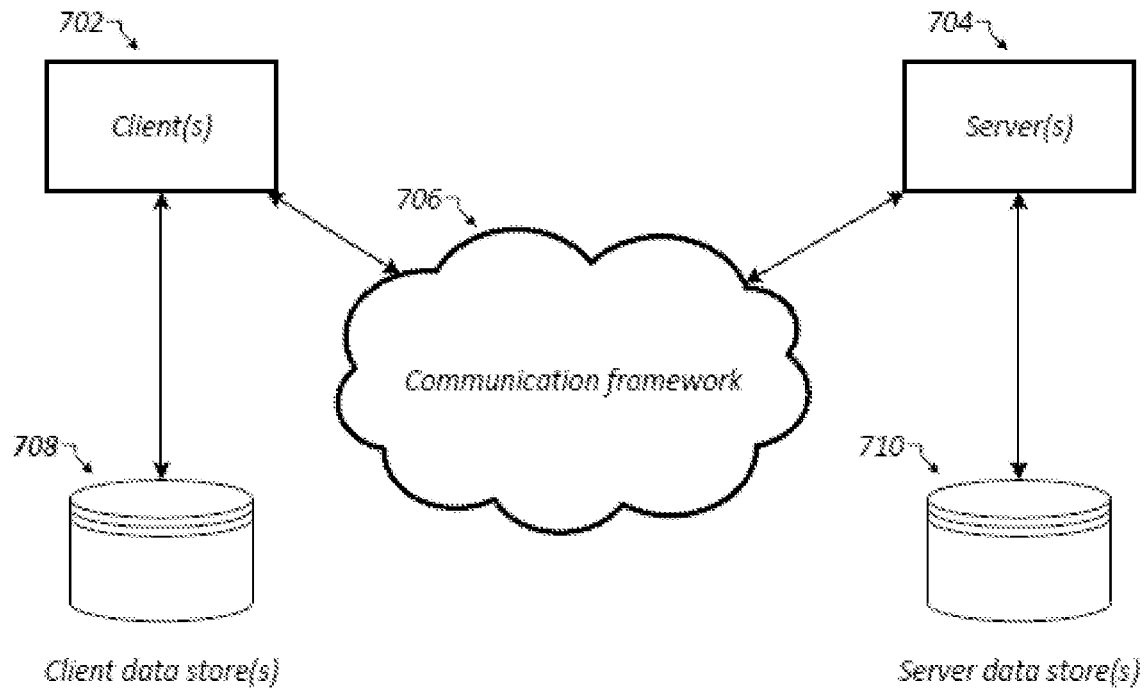
FIG. 7 illustrates exemplary aspects of a communications architecture according to one or more embodiments described hereby.

FIG. 7 illustrates a block diagram of an exemplary communications architecture 700 suitable for implementing various embodiments as previously described, such as communications between conversion agent 104 and data object set 102. The communications architecture 700 includes various common communications elements, such as a transmitter, receiver, transceiver, radio, network interface, baseband processor, antenna, amplifiers, filters, power supplies, and so forth. The embodiments, however, are not limited to implementation by the communications architecture 700.

As shown in FIG. 7, the communications architecture 700 comprises includes one or more clients 702 and servers 704. In some embodiments, communications architecture may include or implement one or more portions of components, applications, and/or techniques described hereby. The clients 702 and the servers 704 are operatively connected to one or more respective client data stores 708 and server data stores 710 that can be employed to store information local to the respective clients 702 and servers 704, such as cookies and/or associated contextual information. In various embodiments, any one of servers 704 may implement one or more of logic flows or operations described hereby, such as in conjunction with storage of data received from any one of clients 702 on any of server data stores 710. In one or more embodiments, one or more of client data store(s) 708 or server data store(s) 710 may include memory accessible to one or more portions of components, applications, and/or techniques described hereby.

The clients 702 and the servers 704 may communicate information between each other using a communication framework 706. The communications framework 706 may implement any well-known communications techniques and protocols. The communications framework 706 may be implemented as a packet-switched network (e.g., public networks such as the Internet, private networks such as an enterprise intranet, and so forth), a circuit-switched network (e.g., the public switched telephone network), or a combination of a packet-switched network and a circuit-switched network (with suitable gateways and translators).

The communications framework 706 may implement various network interfaces arranged to accept, communicate, and connect to a communications network. A network interface may be regarded as a specialized form of an input output interface. Network interfaces may employ connection protocols including without limitation direct connect, Ethernet (e.g., thick, thin, twisted pair 10/100/1900 Base T, and the like), token ring, wireless network interfaces, cellular network interfaces, IEEE 802.11a-x network interfaces, IEEE 802.16 network interfaces, IEEE 802.20 network interfaces, and the like. Further, multiple network interfaces may be used to engage with various communications network types. For example, multiple network interfaces may be employed to allow for the communication over broadcast, multicast, and unicast networks. Should processing requirements dictate a greater amount of speed and capacity, distributed network controller architectures may similarly be employed to pool, load balance, and otherwise increase the communicative bandwidth required by clients 702 and the servers 704. A communications network may be any one and the combination of wired and/or wireless networks including without limitation a direct interconnection, a secured custom connection, a private network (e.g., an enterprise intranet), a public network (e.g., the Internet), a Personal Area Network (PAN), a Local Area Network (LAN), a Metropolitan Area Network (MAN), an Operating Missions as Nodes on the Internet (OMNI), a Wide Area Network (WAN), a wireless network, a cellular network, and other communications networks.

Various embodiments may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable medium which represents various logic within the processor, which when read by a machine causes the machine to fabricate logic to perform the techniques described hereby. Such representations, known as "IP cores" may be stored on a tangible, machine readable medium and supplied to various customers or manufacturing facilities to load into the fabrication machines that actually make the logic or processor. Some embodiments may be implemented, for example, using a machine-readable medium or article which may store an instruction or a set of instructions that, if executed by a machine, may cause the machine to perform a method and/or operations in accordance with the embodiments. Such a machine may include, for example, any suitable processing platform, computing platform, computing device, processing device, computing system, processing system, computer, processor, or the like, and may be implemented using any suitable combination of hardware and/or software. The machine-readable medium or article may include, for example, any suitable type of memory unit, memory device, memory article, memory medium, storage device, storage article, storage medium and/or storage unit, for example, memory, removable or non-removable media, erasable or non-erasable media, writeable or re-writeable media, digital or analog media, hard disk, floppy disk, Compact Disk Read Only Memory (CD-ROM), Compact Disk Recordable (CD-R), Compact Disk Rewriteable (CD-RW), optical disk, magnetic media, magneto-optical media, removable memory cards or disks, various types of Digital Versatile Disk (DVD), a tape, a cassette, or the like. The instructions may include any suitable type of code, such as source code, compiled code, interpreted code, executable code, static code, dynamic code, encrypted code, and the like, implemented using any suitable high-level, low-level, object-oriented, visual, compiled and/or interpreted programming language.

The foregoing description of example embodiments has been presented for the purposes of illustration and description. It is not intended to be exhaustive or to limit the present disclosure to the precise forms disclosed. Many modifications and variations are possible in light of this disclosure. It is intended that the scope of the present disclosure be limited not by this detailed description, but rather by the claims appended hereto. Future filed applications claiming priority to this application may claim the disclosed subject matter in a different manner and may generally include any set of one or more limitations as variously disclosed or otherwise demonstrated hereby.

What is claimed is:

1. An apparatus, the apparatus comprising:
a processor; and
memory comprising instructions that when executed by the processor cause the processor to:
identify a set of data objects, the set of data objects comprising an array of values, wherein each data object in the set of data objects comprises a column value, a row value, and a data value;
determine a first group of data objects in the set of data objects, the first group of data objects corresponding to a first column in the array of values;
determine a second group of data objects in the set of data objects, the second group of data objects corresponding to a second column in the array of values;
concatenate data values from the first group of data objects with the data values from the second group of data objects in a row-wise manner to produce a concatenated group of data values;
determine at least one of a set of a plurality of embedding space parameters based on the concatenated group of data values, wherein the set of embedding space parameters define an embedding space comprising a plurality of dimensions; and
generate a set of object vectors, the set of object vectors comprising an object vector for each data object in the set of data objects, each object vector in the set of object vectors to include a set of dimension values and each dimension value in the set of dimension values to correspond to one of the plurality of dimensions in the embedding space, wherein a respective object vector for a respective data object is generated based on a respective column value of the respective data object, a respective row value of the respective data object, and the set of embedding space parameters.

2. The apparatus of claim 1, wherein the instructions, when executed by the processor, further cause the processor to:
analyze each data value in the first group of data objects to determine one or more characteristics of the first column in the array of values; and
determine at least one of the set of embedding space parameters based on the one or more characteristics of the first column in the array of values.

3. The apparatus of claim 2, wherein the one or more characteristics of the first column comprises a range of lengths for data values in the first column.

4. The apparatus of claim 1, wherein the first column in the array of values is adjacent to the second column in the array of values.

5. The apparatus of claim 1, wherein the instructions, when executed by the processor, further cause the processor to:
provide the set of object vectors as input to a machine learning algorithm; and
determine a classification of each data object in the set of data objects based on output of the machine learning algorithm in response to input of the set of object vectors.

6. The apparatus of claim 1, wherein the instructions, when executed by the processor, further cause the processor to:
determine a third group of data objects in the set of data objects, the third group of data objects corresponding to a third column in the array of values that is adjacent to the first column or the second column in the array of values;

concatenate data values from the first group of data objects with the data values from one or more of the second group of data objects and the third group of data objects in a row-wise manner to produce a second concatenated group of data values; and determine at least one of the set of embedding space parameters based on the second concatenated group of data values.

7. The apparatus of claim 6, wherein the instructions, when executed by the processor, further cause the processor to:

determine a fourth group of data objects in the set of data objects, the fourth group of data objects corresponding to a fourth column in the array of values that is adjacent to the first column, the second column, or the third column in the array of values;

concatenate data values from the first group of data objects with the data values from the second group of data objects, the third group of data objects, and the fourth group of data objects in a row-wise manner to produce a third concatenated group of data values; and determine at least one of the set of embedding space parameters based on the third concatenated group of data values.

8. The apparatus of claim 1, wherein the plurality of dimensions that define the embedding space comprise two or more of a row dimension, a column dimension, a data value dimension, a column statistic dimension, and a concatenation dimension.

9. The apparatus of claim 1, wherein the plurality of dimensions that define the embedding space comprise a plurality of concatenation dimensions and at least one column statistic dimension.

10. At least one non-transitory computer-readable medium comprising a set of instructions that, in response to execution by a processor circuit, cause the processor circuit to:

identify a set of data objects, the set of data objects comprising an array of values, wherein each data object in the set of data objects comprises a column value, a row value, and a data value;

determine a first group of data objects in the set of data objects, the first group of data objects corresponding to a first column in the array of values;

determine a second group of data objects in the set of data objects, the second group of data objects corresponding to a second column in the array of values that is adjacent to the first column in the array of values;

concatenate data values from the first group of data objects with the data values from the second group of data objects in a row-wise manner to produce a concatenated group of data values;

determine at least one of a set of a plurality of embedding space parameters based on the concatenated group of data values, wherein the set of embedding space parameters define an embedding space comprising a plurality of dimensions; and generate a set of object vectors, the set of object vectors comprising an object vector for each data object in the set of data objects, each object vector in the set of object vectors to include a set of dimension values and each dimension value in the set of dimension values to correspond to one of the plurality of dimensions in the embedding space, wherein a respective object vector for a respective data object is generated based on a respective column value of the respective data object, a respective row value of the respective data object, and the set of embedding space parameters.

11. The at least one non-transitory computer-readable medium of claim 10, wherein the set of instructions, in response to execution by the processor circuit, further cause the processor circuit to:

analyze each data value in the first group of data objects to determine one or more characteristics of the first column in the array of values; and determine at least one of the set of embedding space parameters based on the one or more characteristics of the first column in the array of values.

12. The non-transitory computer-readable medium of claim 11, wherein the one or more characteristics of the first column comprises a range of lengths for data values in the first column.

13. The non-transitory computer-readable medium of claim 10, wherein the set of instructions, in response to execution by the processor circuit, further cause the processor circuit to:

determine a third group of data objects in the set of data objects, the third group of data objects corresponding to a third column in the array of values that is adjacent to the first column on an opposite side as the second column in the array of values;

concatenate data values from the first group of data objects with the data values from the third group of data objects in a row-wise manner to produce a second concatenated group of data values; and determine at least one of the set of embedding space parameters based on the second concatenated group of data values.

14. The non-transitory computer-readable medium of claim 10, wherein the set of instructions, in response to execution by the processor circuit, further cause the processor circuit to:

provide the set of object vectors as input to a machine learning algorithm; and determine a classification of each data object in the set of data objects based on output of the machine learning algorithm in response to input of the set of object vectors.

15. The non-transitory computer-readable medium of claim 10, wherein the set of instructions, in response to execution by the processor circuit, further cause the processor circuit to:

determine a third group of data objects in the set of data objects, the third group of data objects corresponding to a third column in the array of values that is adjacent to the first column or the second column in the array of values;

concatenate data values from the first group of data objects with the data values from the second group of data objects and the third group of data objects in a row-wise manner to produce a second concatenated group of data values; and determine at least one of the set of embedding space parameters based on the second concatenated group of data values.

16. The non-transitory computer-readable medium of claim 10, wherein the plurality of dimensions that define the embedding space comprise two or more of a row dimension, a column dimension, a data value dimension, a column statistic dimension, and a concatenation dimension.

17. The non-transitory computer-readable medium of claim 16, wherein the plurality of dimensions that define the embedding space comprise a plurality of concatenation dimensions and at least one column statistic dimension.

18. A computer-implemented method, comprising:

identifying a set of data objects, the set of data objects comprising an array of values, wherein each data object in the set of data objects comprises column value, a row value, and a data value;

determining a first group of data objects in the set of data objects, the first group of data objects corresponding to a first column in the array of values;

determining a second group of data objects in the set of data objects, the second group of data objects corresponding to a second column in the array of values that is adjacent to the first column in the array of values;

concatenating data values from the first group of data objects with the data values from the second group of data objects in a row-wise manner to produce a concatenated group of data values;

determining at least one of a set of a plurality of embedding space parameters based on the concatenated group of data values, wherein the set of embedding space parameters define an embedding space comprising a plurality of dimensions; and generating a set of object vectors to be input into a machine learning algorithm, the set of object vectors comprising an object vector for each data object in the set of data objects, each object vector in the set of object vectors to include a set of dimension values and each dimension value in the set of dimension values to correspond to one of the plurality of dimensions in the embedding space, wherein a respective object vector for a respective data object is generated based on a respective column value of the respective data object, a respective row value of the respective data object, and the set of embedding space parameters.

19. The computer implemented method of claim 18, comprising:

analyzing each data value in the first group of data objects to determine one or more characteristics of the first column in the array of values; and determining at least one of the set of embedding space parameters based on the one or more characteristics of the first column in the array of values.

20. The computer implemented method of claim 18, comprising:

providing the set of object vectors as input to the machine learning algorithm; and determining a classification of each data object in the set of data objects based on output of the machine learning algorithm in response to input of the set of object vectors.

* * * * *